July 30, 1940.   S. G. BURROUGHS   2,209,317
PURIFICATION OF AROMATIC STILL RESIDUES
Filed Aug. 9, 1939
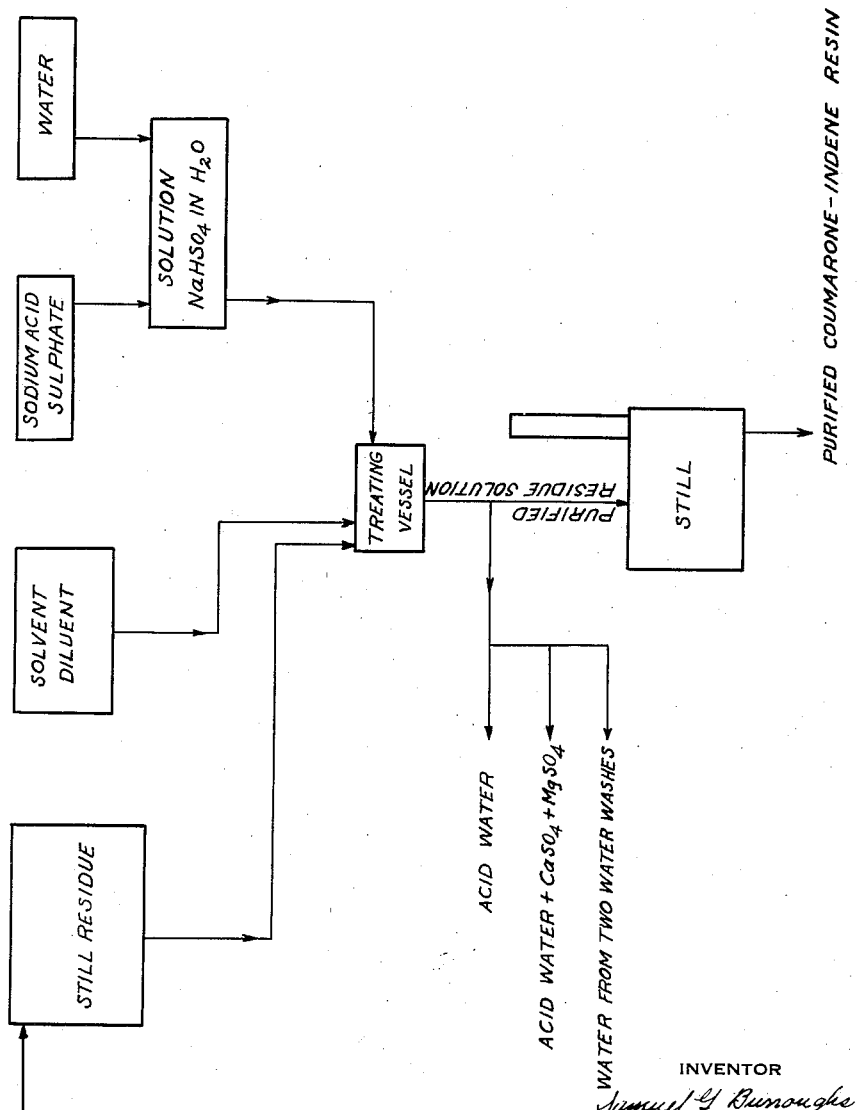
INVENTOR
Samuel G. Burroughs
by Christy and Wharton
attorneys Patented July 30, 1940

2,209,317

UNITED STATES PATENT OFFICE 2,209,317

PURIFICATION OF AROMATIC STILL RESIDUES

Samuel G. Burroughs, Pittsburgh, Pa., assignor to Pennsylvania Industrial Chemical Corporation, a corporation of Pennsylvania Application August 9, 1939, Serial No. 289,272

3 Claims. (Cl. 260—81)

This invention relates to the purification of coal-derived still residue and to an increase in the content of resinous coumarone-indene substances in the still residue as an incident to the purification treatment.

The still residue with which I am concerned is a substance residually produced in the fractionation and purification treatments of the light oil recovered in the by-product coking of coal. This light oil comes over in coal distillation. By far the greatest proportion of the light oil distills over before tar in by-product coking, and is recovered from the gases with which it comes over by being absorbed in a scrubbing oil, which scrubbing oil is usually a heavy cut of petroleum. This still residue contains polymers of resin-forming bodies in various stages of polymerization, some heavy monomers, traces of naphthalene, and various percentages of sulphates and sulphonates. It is a dark, viscous, oily substance deficient in drying qualities, and itself possessing but little utility in the arts. As it is commercially available, the still residue may be obtained from either, or both, of the following operations conducted upon the light oil.

Briefly to discuss this still residue, such still residue may be produced from the fractionation of light oil in initial, or "crude" stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates. The various still residues, because of the heat treatment, or acid purification treatment, or both of such treatments, to which the light oil is subjected, comprise a large percentage of polymers of the light oil unsaturates, such as coumarone and indene, in varying proportions. Usually the still residue is subjected in the by-product plant to a distillation for the removal of solvents and naphthalene. There is variation in the above-noted practice in different coking plants. Light oil is in some plants additionally recovered by distillation of the tar in which it is entrapped, not all of the light oil coming over during the initial distillation. This fraction of light oil recovered from the tar is contaminated with phenols, pyridine bases, and other typical tar ingredients, which, however, are removed by a preliminary purification prior to the several typical fractionating and purification treatments given above to which the light oil is subjected. The residues with which I deal may be considered, for all practical purposes, as free from tar ingredients, even though derived, or partially derived, by distillation from tar.

As still residue of this sort is commonly available commercially, it contains sulphonates from the acid purification and neutralization of the light oil, followed by the distillation in the "pure stills" which results in the production of a residue. These sulphonates are in the form of the alkaline and alkaline earth salts of sulphonates of light oil aromatics; and alkaline additive compounds of the light oil aromatics and the sulphate radical. Sulphate addition products are also present in the same mass of impurities. All are herein included in the general term "sulphonates."

Assuming that the starting material is a still residue containing sulphonates, a solid resinous material may be obtained from the still residue by distillation, which distillation may be either straight distillation, vacuum distillation, steam distillation, or a steam and vacuum distillation. In distilling the sulphonate contaminated still residue, I have carried the temperature of distillation to such point, and have continued distillation for such time that there is distilled off the coal tar solvent content of the still residue, and all other of the more volatile ingredients, thus leaving resin and sulphonates in intimately commingled condition. I have found a still temperature of 550° F., when distillation is conducted with steam and under vacuum of about 20 inches of mercury, adequate to obtain distillation to a point at which a residual sulphonate contaminated resin is obtained. At atmospheric pressure and without the use of steam I have found adequate for distillation a still temperature of 575° F., or slightly lower.

If such distillation be conducted upon a still residue of the sort above described, which is not subjected to initial purification, the resultant solid product, or sulphonate contaminated resin, is a dark brown to blackish material, which differs definitely in important characteristics from a coumarone type resin which does not contain sulphonates. It has an ability to resist flowing when raised to its softening temperature, possessing a high viscosity at such temperatures. When distillation is carried to a point at which substantially all the dimers of the light oil aromatics have been driven off, and the material recovered as solid resin, this solid resin usually has a melting-point approximately as high as 125° C. (ball and ring method). The color depth is about 17 or 18 on the coal tar resin color scale.

While usable for some purposes, this sulphonate contaminated resin obtained as the solid residuum from the distillation of unpurified still residue, has qualities which render it unsuitable for many purposes, amongst which is use as the resin content of a binder composition for mastic tile, linoleum, or the like. This is for the reason that its penetration at 115° F. (the standard upper temperature for determining penetration in mastic tile binder materials), is so high that it is difficult to combine with it in a tile binder sufficient plasticizer to give the binder composition adequate penetration at 77° F. without rendering its penetration at 115° F. too high. A tile made with resin from unpurified still residue also tends to water-spot.

My invention consists in the discovery that I may with advantage use the acid salt of sulphuric acid, sodium acid sulphate, and its substantial equivalents, as the reagent in a decomposition reaction by which the sulphonates of coumarone and indene are decomposed, to give free coumarone and indene and an inorganic reaction product. The exemplary drawing is a fragmentary diagrammatic view, or flow sheet, supplied with legends, and illustrative of the process performed by the applicant on his starting material.

The following illustrates exemplary procedure by which the sulphonate content of a sulphonate-contaminated still residue may be decomposed with recovery of coumarone-indene substances of the sulphonates, and with purification of the still residue:

Example No. 1

Taking 700 gallons of raw still residue I introduced this starting material into a treating vessel provided with suitable means for raising the temperature of its contents, and provided with means for agitating the contents of the vessel. This starting material I diluted with 1000 gallons of crude solvent naphtha representative of a solvent diluent for the still residue, and solvent for the sulphonates of coumarone and indene contained in it. The temperature of the solution was raised to about 60° C. and I introduced a water solution of 1225 lbs. of sodium acid sulphate in 400 gallons of water, this water solution of the reagent having, for the purpose of accelerating the process, previously been raised to a corresponding temperature.

After addition of the reagent, the temperature of the batch was maintained, while forming a mechanical mixture of the reactive solution and the reagent solution by agitation. Agitation and heating was continued for about 15 minutes. During this treating period a heavy white precipitate was formed, and at the end of the period the completion of the reaction was indicated by the fact that formation of the precipitate ceased. The reacted mixture was allowed to settle with stratification into a water layer and a layer of the still residue solution. In the water layer there was a heavy white precipitate of calcium sulphate. The water layer was then drawn off and the still residue solution was subjected to finishing treatment. By the decomposing reaction, the calcium sulphonates were decomposed to form calcium sulphate and the sodium salts of the sulphonates, which latter dissolve in the excess sodium acid sulphate water solution. Both are drawn off with the water. This leaves in the still residue solution approximately nothing of the initial structure of the sulphonates except pure coumarone and indene.

In finishing the purification treatment, the still residue solution was given a mild alkaline wash with a dilute solution of sodium carbonate to "brilliant yellow"; and was then washed with pure water. The material remaining after removal of the wash water by settling, or decantation, is a solution of purified still residue, consisting preponderantly of coumarone and indene in various stages of polymerization in solution in solvent naphtha. In the solution, the content of coumarone and indene polymers has been supplemented by the content of those polymers released from combination in the contaminating sulphonates, and the solvent content of the solution consists of the added crude solvent naphtha supplemented by the solvent content of the still residue. The solution was distilled for the separation of its solvent content and for the separate recovery of coumarone-indene dimers forming dipolymer oil, and the solid resin consisting chiefly of coumarone-indene polymers in the stages of polymerization higher than that of the dimers. The recovery by distillation was as follows:

Crude solvent naphtha_____gals__ 1050
Dipolymer oil_____gals__ 400
Solid coumarone-indene resin M. P. about 90° C. (ball and ring)_____lbs__ 3000

The resin was about a 10 to 14 color on the coumarone-indene resin color scale which is a color intensity sufficiently low to render the resin usable for many purposes. The yield of solid resin was about 8% to 10% greater than that of purified solid coumarone-indene resin recovered from raw still residue by methods of purification which do not involve decomposition of the sulphonates.

It is to be understood that either the dipolymer oil recovered by distillation after the solvent naphtha has come over, or the entire purified content of coumarone and indene polymers in the still residue after distillation of the solvent naphtha may be subjected to oxidation, either alone, or mixed with an oxidizable oil to give a fluid product having drying qualities, or an elastic gummy material usable as a plasticizer in the binder composition for mastic tile.

My discovery thus primarily is that sodium acid sulphate may be used as a reagent in the decomposition of the sulphonate content of still residues of the aromatic light oil. It is a desirable reagent to use for such purpose, in that it is a water-soluble reagent which may be shipped and stored as a solid, and in the convenience and safety of its storage and handling. Sodium acid sulphate gives a high concentration of the sulphate radical in water solution, and gives a salt solution of so much greater density than the density of pure water that separation by stratification into a water layer and a solvent layer is facilitated. Potassium acid sulphate is, for my purpose, identical with sodium acid sulphate, and may for the purpose of my process be considered as the same substance. I may also use any water-soluble salt of a mineral acid giving an acid reaction in water solution, which will form a water-insoluble calcium salt, and a water-soluble sulphonate salt. For example, I may use magnesium sulphate, or sodium or potassium di-hydrogen phosphate.

It has been above explained that the term "sulphonates," as herein used, is employed generically to designate several cumarone and indene combinations with the sulphate radical and with calcium or magnesium. Calcium is the alkaline metal usually preponderantly present in the sulphonates of still residues of this type. This is for the reason that lime is most commonly used in purification of the light oil from the by-product coking of coal. Sodium hydroxide is frequently used, to replace or supplement the lime in neutralization, during purification of the still residue. Magnesium is infrequently present. Both these latter substances form water-soluble salts in reaction of the sulphonates with the sodium acid sulphate.

While the reaction between the sulphonates and the sodium acid sulphate is exothermic, it is not strongly so. I have found that decomposition in accordance with the reactions given above, does not completely take place at temperatures below 50° C., and there is an upper temperature limit, under usual atmospheric pressures, of 100° C., the boiling point of the water present in the reaction mixture. The reaction proceeds best if the temperature is approximately as high as 60° C. Moderately elevated temperature is not necessary in order that the reaction in substantial measure may take place. In addition to accelerating the reaction it does, however, tend to retain sodium sulphate, if it be present as a product of the reaction, in a supersaturated solution after reaction, thus rendering possible a clean separation of those reaction products from the solvent solution of still residue purified by the decomposition reaction.

As included in the sulphonates themselves the cumarone-indene substances are almost entirely in the stage of polymers of cumarone and indene higher than the dimers of those substances. In the remainder of the still residue they are present in various molecular stages, as monomers, dimers, and higher polymers. For this reason the order of distillation to which the still residue is subjected determines the melting point of the resinous residue in accordance with the proportion of dimers which are distilled off. The decomposition of the sulphonates does not produce polymerization as an incident, my instant process being definitely a purification and recovery process, and not a polymerization process.

Example No. 1 gives preferred proportions of raw still residue subjected to purification, crude solvent naphtha, and water solution of sodium acid sulphate. It is, however, possible to give a more general procedural guide, by following which optimum conditions may be established in treating still residues of differing sulphonate content. Such guided procedure may be in accordance with the following example.

*Example No. 2*

Raw still residue in the quantity of 260 gals. was diluted with 370 gals. of crude solvent naphtha, and with agitation was raised to a temperature in excess of 60° C. A solution was made of 50 lbs. of sodium acid sulphate in about 16 gals. of water. This was added to the still residue solution until the mixture was acid to Congo red, and that condition was maintained until the reaction was complete.

Recovery was conducted in the manner described in Example No. 1.

If a petroleum distillate, such as mineral spirits, be used to dilute the raw still residue, I have found that the quantity used may be less than the quantity of crude solvent naphtha, without detriment to the effectiveness of the diluent. The following may be given as exemplary of good practice, utilizing mineral spirits instead of crude solvent naphtha:

*Example No. 3*

Raw still residue in the quantity of 260 gals. was diluted with 150 gals. of mineral spirits, and with agitation was raised to a temperature in excess of 60° C. A solution was made of 50 lbs. of sodium acid sulphate in about 16 gals. of water. This was added, as in Example No. 2, to establish and maintain the mixture acid to Congo red.

Recovery was conducted as in Example No. 1.

It should be explained that dilution of the raw still residue is not requisite in effecting the decomposition reaction. It is a great help in the process as a whole, in that it sufficiently reduces the gravity of the still residue to inhibit its emulsification with the water solution of the reagent, and to insure separation by stratification on settling.

I claim as my invention:

1. The herein disclosed method of recovering cumarone and indene substances of an aromatic still residue in sulphonate-free condition and including a cumarone and indene content of metallic sulphonates of cumarone and indene in addition to the free cumarone and indene content in coal-derived still residue from the purification of light oil produced in by-product coking, with purification of the said still residue, which consists primarily in decomposing the sulphonates in the still residue by reaction with sodium acid sulphate in water solution, and separating the still residue thus purified and containing the cumarone and indene substances released from combination by the reaction from the inorganic sulphates formed by the reaction.

2. The herein described method of recovering cumarone and indene substances of an aromatic still residue in sulphonate-free condition and including a cumarone and indene content of metallic sulphonates of cumarone and indene in addition to the free cumarone and indene content in coal-derived still residue from the purification of light oil produced in by-product coking, with purification of the still residue, which consists primarily in decomposing the sulphonates in the still residue by reaction with a water solution of salt of a mineral acid, which salt is acid in water solution, selected from a group consisting of sodium acid sulphate and potassium acid sulphate, and separating the still residue thus purified and containing the cumarone and indene substances released from combination by the decomposition reaction from the inorganic salts formed by the reaction.

3. The herein described method of recovering cumarone and indene substances of an aromatic still residue in sulphonate-free condition and including a cumarone and indene content of metallic sulphonates of cumarone and indene in addition to the free cumarone and indene content in coal-derived still residue from the purification of light oil produced in by-product coking, with purification of the said still residue, which consists primarily in decomposing the sulphonates in the still residue by reaction with a water solution of a salt of a mineral acid, which salt is acid in water solution and capable of reacting to form a water-insoluble calcium salt and a water-soluble sulphonate, and separating the still residue thus purified and containing the cumarone and indene substances released from combination by the decomposition reaction from the inorganic salts formed by the reaction.

SAMUEL G. BURROUGHS.